United States Patent
Fuhlbrigge et al.

(10) Patent No.: US 7,643,907 B2
(45) Date of Patent: Jan. 5, 2010

(54) METHOD AND APPARATUS FOR DEVELOPING A METADATA-INFUSED SOFTWARE PROGRAM FOR CONTROLLING A ROBOT

(75) Inventors: Thomas A. Fuhlbrigge, Manchester, CT (US); Gregory Rossano, Enfield, CT (US); Hui Zhang, West Hartford, CT (US); Jianjun Wang, West Hartford, CT (US); Zhongxue Gan, Windsor, CT (US)

(73) Assignee: ABB Research Ltd., Zurich (CH)

( * ) Notice: Subject to any disclaimer, the term of this patent is extended or adjusted under 35 U.S.C. 154(b) by 963 days.

(21) Appl. No.: 11/054,816

(22) Filed: Feb. 10, 2005

(65) Prior Publication Data

US 2006/0178778 A1 Aug. 10, 2006

(51) Int. Cl.
G05B 15/00 (2006.01)
(52) U.S. Cl. .................. 700/264; 700/90; 700/245
(58) Field of Classification Search .............. 702/33, 702/38, 64, 65; 73/1.16, 1.73, 116.02; 477/119; 475/127; 251/5, 12, 30.01, 58, 129.01, 290
See application file for complete search history.

(56) References Cited

U.S. PATENT DOCUMENTS

| | | | |
|---|---|---|---|
| 4,589,810 | A | 5/1986 | Heindl et al. |
| 5,485,552 | A | 1/1996 | Mizuno et al. |
| 5,608,619 | A | 3/1997 | Brantmark et al. |
| 5,790,401 | A | 8/1998 | Shields |
| 5,850,548 | A | 12/1998 | Williams |
| 5,875,331 | A | 2/1999 | Lindsey |
| 6,154,875 | A | 11/2000 | Tanaka et al. |
| 6,167,328 | A | 12/2000 | Takaoka et al. |
| 6,292,715 | B1 | 9/2001 | Rongo |
| 6,366,293 | B1 | 4/2002 | Hamilton et al. |

(Continued)

FOREIGN PATENT DOCUMENTS

EP 1435553 A1 7/2004

(Continued)

OTHER PUBLICATIONS

Calvert, C: "Charlie Calvert's Delphi 4 Unleashed" Nov. 1998 Sams Publsihing USA pp. 28-70.*

(Continued)

*Primary Examiner*—Khoi Tran
*Assistant Examiner*—Stephen Holwerda
(74) *Attorney, Agent, or Firm*—Paul R. Katterle

(57) ABSTRACT

The present invention is directed to a method and apparatus for developing a metadata-infused software program for controlling a device, such as a robot. A first library of software segments with metadata and a second library of script documents are provided. A part program wizard uses a script document selected from the second library to display queries on a screen of an interface device. Using input information received in response to the queries, the part program wizard selects and combines software segments from the first library to produce the metadata-infused software program. The metadata identifies the selected software segments and includes statuses of the selected software segments. A graphical representation of the metadata infused software program is displayed on the screen and conveys the statuses of the software segments. A deployment wizard is utilized to teach data points for the metadata-infused software program.

28 Claims, 14 Drawing Sheets

U.S. PATENT DOCUMENTS

| | | |
|---|---|---|
| 6,477,435 B1 | 11/2002 | Ryan et al. |
| 6,560,513 B2 | 5/2003 | Krause et al. |
| 6,564,368 B1 | 5/2003 | Beckett et al. |
| 6,594,823 B1 | 7/2003 | Corbin et al. |
| 6,626,957 B1 | 9/2003 | Lippert et al. |
| 6,697,707 B2 | 2/2004 | Peters, II |
| 6,714,219 B2 | 3/2004 | Lindhorst et al. |
| 6,724,409 B1 | 4/2004 | Maddocks et al. |
| 6,795,748 B2 | 9/2004 | Hammer et al. |
| 2002/0004804 A1 | 1/2002 | Muenzel |
| 2002/0193909 A1 | 12/2002 | Parker |
| 2004/0015832 A1 | 1/2004 | Stapp et al. |
| 2004/0046806 A1 | 3/2004 | Makowski |
| 2004/0088688 A1 | 5/2004 | Hejlsberg et al. |
| 2004/0143810 A1 | 7/2004 | Ahmed et al. |
| 2004/0148588 A1 | 7/2004 | Sadlq |
| 2004/0199288 A1 | 10/2004 | Watanabe et al. |
| 2004/0230946 A1 | 11/2004 | Makowski |

FOREIGN PATENT DOCUMENTS

| | | |
|---|---|---|
| EP | 1724676 | 11/2006 |

OTHER PUBLICATIONS

Haage, M: "Rapid Force Expansion Proposal" 3rd Draft Jul. 29, 2003 pp. 1-18.*

Kazi,A; Seyfarth,M "Style Guide for Icon-Based Programming". Public domain document in the BMBF lead project MORPHA. KUKA Roboter GmbH Augsburg/Reis Robotics, Obernburg. (2002) Available at: www.morpha.de.

Bischoff, R;Kazi,A;Seyfarth,M: "The MORPHA Style Guide for Icon-Based Programming"Public domain document in the BMBF lead project MORPHA, KUKA Roboter GmbH;Reis Robotics.available at: www.morpha.de.

Biggs,G; MacDonald,B:"A Survey of Robot Programming Systems". Department of Electrical & Electronic Engineering, University of Auckland. (2003) available at: www.ele.auckland.ac.nz.

Gauss,M: "Adaptive Robot-Based Visual Inspection of Complex Parts" Exciting Developments in Applied Research, (Online) Jun. 3, 2003 pp. 1-9 XP002372942.

Haage,M: "Rapid Force Extension Proposal" 3rd.Draft (on Line) Jul. 29, 2003 pp. 1-18,XP002372941.

Calvert,C:"Charlie Calvert's Delphi 4 Unleashed" Nov. 1998 Sams Publishing U.S.A. XP002372944 p. 28-p. 70.

Kalejs,E: "European Search Report" Munich,Germany Mar. 20, 2006.

Rasmus Lundqvist et al, New Interface for Rapid Feedback Control on ABB-Robots, Linköping University, Institutionen för konstruktions- och produktionsteknik, Feb. 18, 2005.

* cited by examiner

```
!<Action Executed="True">
!<Name>Weld Upper Bracket</Name>
!<Description>This path attaches the upper bracket to the flange. Teach the
weld points so they are about 1mm from the edge and make sure the weld
goes the entire length of the bracket. </Description>
!<TeachNumber>2</TeachNumber>
!<HelpText >Make sure the wire stick-out is the standard length</HelpText >
!<ImageFile />
!< TemplateInfo>
!<ProcessTemplateName>Fillet_4</ProcessTemplateName>
!<ToolName>tWeldGun</ToolName>
!<WobjName>wobj0</WobjName>
!</TemplateInfo>
!<ApproachPoints>
MoveJ trg1_1, v100, z10, tWeldGun\wobj:=wobj0;
!</ApproachPoints>
!<ProcPath>
ArcL\On, trg1_2, v100, sm1, wd1, weave1, z1, tWeldGun\wobj:=wobj0;
ArcL trg1_3, v100, sm1, wd1, weave1, z1, tWeldGun\wobj:=wobj0;
ArcL trg1_4, v100, sm1, wd1, weave1, z1, tWeldGun\wobj:=wobj0;
ArcL\Off, trg1_5, v100, sm1, wd1, weave1, z1, tWeldGun\wobj:=wobj0;
!</ProcPath>
!<DepartPoints>
MoveL trg1_6, v100, z5, tWeldGun\wobj:=wobj0;
!</DepartPoints>
!<GeometryPoints />
!</Path>
!</Action>
```

Fig. 5

A) Contour Following

B) Learned Path

Optimization Wizard:
This position has no process associated with it, but the corner zone is: z5
Increasing the zone size may improve the program cycle time. Press 'Edit' to select a larger zone.
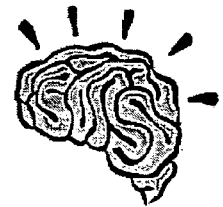
Tool: Tool0
Wobj: Wobj0
12e
Fig. 13

METHOD AND APPARATUS FOR DEVELOPING A METADATA-INFUSED SOFTWARE PROGRAM FOR CONTROLLING A ROBOT

BACKGROUND OF THE INVENTION

This invention relates to software application development and more particularly to the development of a software application for controlling a device, such as a robot.

A software application for controlling a device is often written in a language that has been specially developed by a manufacturer of the device. Although the languages of different manufacturers may be based on the same high level language, such as the C programming language, each manufacturer's language typically has its own syntax and semantics. This is especially true in the field of robotics. For example, one robot manufacturer may write a command to linearly move a robot from one point or position to another as "MoveL toPoint1, speed100, zone1, tool1;" and a different manufacturer as "PTP P1 CONT Vel=100% PDATA1". Each language is meant to be readable by an experienced programmer who may, using that language, reasonably write and test a program to do the job at hand. There are software tools for each particular language that help the user with the proper syntax and semantics so that the program can be loaded into the robot controller without errors.

One major issue with current control programming is that it requires detailed knowledge of both the particular control language in use and the process in which the controlled device is used. Thus, with current control programming techniques, the programmer must be an expert at both the particular control language and the process in which the controlled device is used. This is especially true for programming a robot, such as an industrial robot manipulator.

For each make of robot, even users with a low knowledge level must learn a new language in order to update or alter a robot program. Robot manufacturers have resisted making a common language for industrial robots in the belief that they would be limited in their ability to implement new features and would lose their competitive advantage. Also, solutions that localize the robot language to the user's native language do not address the fundamental problem that the user must still learn the robot language, even if some of the words are in his native tongue. What has not been addressed is the user's need to create a program using words and phrases familiar to him and common in his particular process or industry.

Another major issue with current robot programming is that teaching the robot the process path can be a tedious and complex task. The experience of the particular user who is teaching the robot the path is a large factor in obtaining a good result, and re-teaching is needed whenever the manufacturing conditions or environments change. Also, the process may require large numbers of path points for complex curves, a process path accuracy that is difficult for an operator to achieve by hand, and other special process specific issues such as strict tool orientation requirements that an operator may have difficulty programming. In many cases, Computer Aided Design (CAD) models for the workpiece are not available, which prevents off-line teaching of complicated paths in one of the various robotics simulation packages available on the marketplace. Thus the user is left with hours or even weeks of path teaching time when programming very complicated parts or processes.

Additionally, robot programs themselves have been criticized for being obtuse and written according to the whims and knowledge level of the particular programmer. Often a program will have procedure calls and logic whose purpose is not apparent to a programmer who may be required to troubleshoot or add to an existing program. The structure of the program itself may not be consistent even between two robots performing the same process. Too often, the new programmer finds it quicker to rewrite the entire program rather than try to understand and improve on the existing one.

In an attempt to make robot programming more user friendly, several graphic programming methods have been proposed and/or developed. One such method is utilized by the LEGO® Mindstorms robot system. Another such system is described in "The MORPHA Style Guide for Icon-Based Programming". These types of graphic programming methods have a flowchart form and utilize standard icons. Such programming methods have met with limited success in complex robotic applications because of the difficulty in developing a complex program using standard icons. Common parts of even a simple robot routine, such as an error handler, can be difficult to graphically program in a simple and direct manner. Moreover, the standard icons may not be very descriptive and may require a programmer to be intimately familiar with the symbology of the graphical programming language. As a result, flowchart-type graphical programs can be even more difficult to understand than conventional code programs. In addition, flowchart-type graphical programming is primarily focused on graphically representing a robot program, rather than facilitating proper and/or more efficient robot programming.

There are several other aspects of robot programming that are not addressed in current industrial robot programming methodologies. One such aspect is information about the robot program and program data. For example, with current programming technology, it is not possible to know if position data in a move command has been taught, should be taught, or if it has been tested. Also, currently it is not possible to know how different lines or sections of a program are related to each other. There is no method of grouping together related parts of the program to give the sections the appropriate context and to state what a particular part of a program is trying to accomplish.

Another unresolved area in current robot programming methodologies is the separation of the process to be performed from the particular data of an installation. For example, two similar robot installations making the same part with the same tooling for the same customer, but used by two different companies, will often have unrelated programs, since each robot was programmed by a different programmer. With current robot programming practices, the data pertinent to the particular installation is entwined with the data that is common to the process in general. Both robots are performing the same process in both installations, but the particular positions they move to and the particular inputs they read and outputs they set are different. What is needed is a method to separate the common process data, which determines what the robot should do and in what order, from the particular data unique to the installation, such as the actual location of the 'home' position.

Another need not addressed in current robot programming methodologies is the need to organize the overall structure of the robot programs. Previous attempts to standardize robot programs have met with limited success since they either sacrificed flexibility for commonality by enforcing a strict structure, or they merely left open spaces in the standard program for users to insert code to fit their unique needs. What has not been previously provided is structure, and a method for the programmer to take advantage of that structure, which allows him complete flexibility, yet enables the programmer to make standard programs that may be used in multiple installations.

Another need not solved in current robot programming methodologies is the ability to embed within the robot program the knowledge of how to accomplish a particular process. In current practice, it is the programmer that must have the requisite knowledge and experience about a particular process in order to properly program the robot installation. The programmer is not assisted by the robot in any way because the robot itself has no knowledge about how to accomplish the process. Thus there is a need for an embedded data structure that can contain the sequences and process parameters necessary to accomplish a certain process and a methodology that enables the robot itself to guide the user through the programming process.

The apparatus and method of the present invention are directed toward improving the foregoing aspects of conventional control programming (and in particular, robot programming).

SUMMARY OF THE INVENTION

In accordance with the present invention, a method of developing an executable software program is provided. In accordance with the method, a library of segments of software code with metadata is provided. The metadata of each segment identifies the segment and includes a status of the segment. A plurality of the segments are selected from the library. Graphical representations of the selected segments are displayed and the selected segments are connected. The graphical representations convey the statuses of the selected segments.

A computer program product is also provided in accordance with the present invention. The computer program product is for use with a central processing unit (CPU) and includes a computer-readable medium and a library and a development program stored on the computer-readable medium. The library has segments of software code with metadata. The metadata of each segment identifies the segment and includes a status of the segment. The development program has instructions for causing the CPU to execute a method of developing an executable software program. In accordance with the method, a plurality of the segments are selected from the library. Graphical representations of the selected segments are displayed and the selected segments are connected. The graphical representations convey the statuses of the-selected segments.

Further in accordance with the present invention, an apparatus is provided for controlling a robot. The apparatus includes an interface device, a storage medium, a library, a program development wizard and a robot controller. The interface device includes a central processing unit (CPU) and a display. The library is stored on the storage medium and includes segments of robot code with metadata. The program development wizard is runnable on the CPU to execute a method of developing an executable robot control software program. In accordance with the method, information is elicited from a user and information is received from the user. Using the received user information, a plurality of the segments are selected from the library. Graphical representations of the selected segments are displayed on the display and the selected segments are combined. The robot controller executes the robot control software program to control the robot.

Further in accordance with the present invention, a method is provided for controlling a robot. In accordance with the method, a robot program is provided. The robot program comprises metadata and robot code represented in XML. The robot code is interpreted to control the robot and the metadata is interpreted to display graphical representations of the robot program. The interpretation of the robot code and the metadata is performed simultaneously.

Still further in accordance with the present invention, a computer program product is provided for use with a central processing unit (CPU) and a robot controller. The product includes a computer-readable medium and a robot control software program stored on the computer-readable medium. The robot control software program includes robot code infused with metadata that identifies segments of the robot code. The robot control software program includes instructions for causing the robot controller to move a robot along a process path having a plurality of position points with default values. A deployment wizard is provided and is stored on the computer-readable medium. The deployment wizard has instructions for causing the CPU to execute a method of teaching the robot control software program. The method includes teaching the position points by replacing the default values with taught values. The metadata includes information for teaching the position points.

BRIEF DESCRIPTION OF THE DRAWINGS

FIG. 5 shows a program segment represented in a mark-up language;

FIG. 13 shows a screen display of a recommendation generated by an optimization wizard of the development application for a fifth metadata-infused software program;

DETAILED DESCRIPTION OF ILLUSTRATIVE EMBODIMENTS

Figure 1:
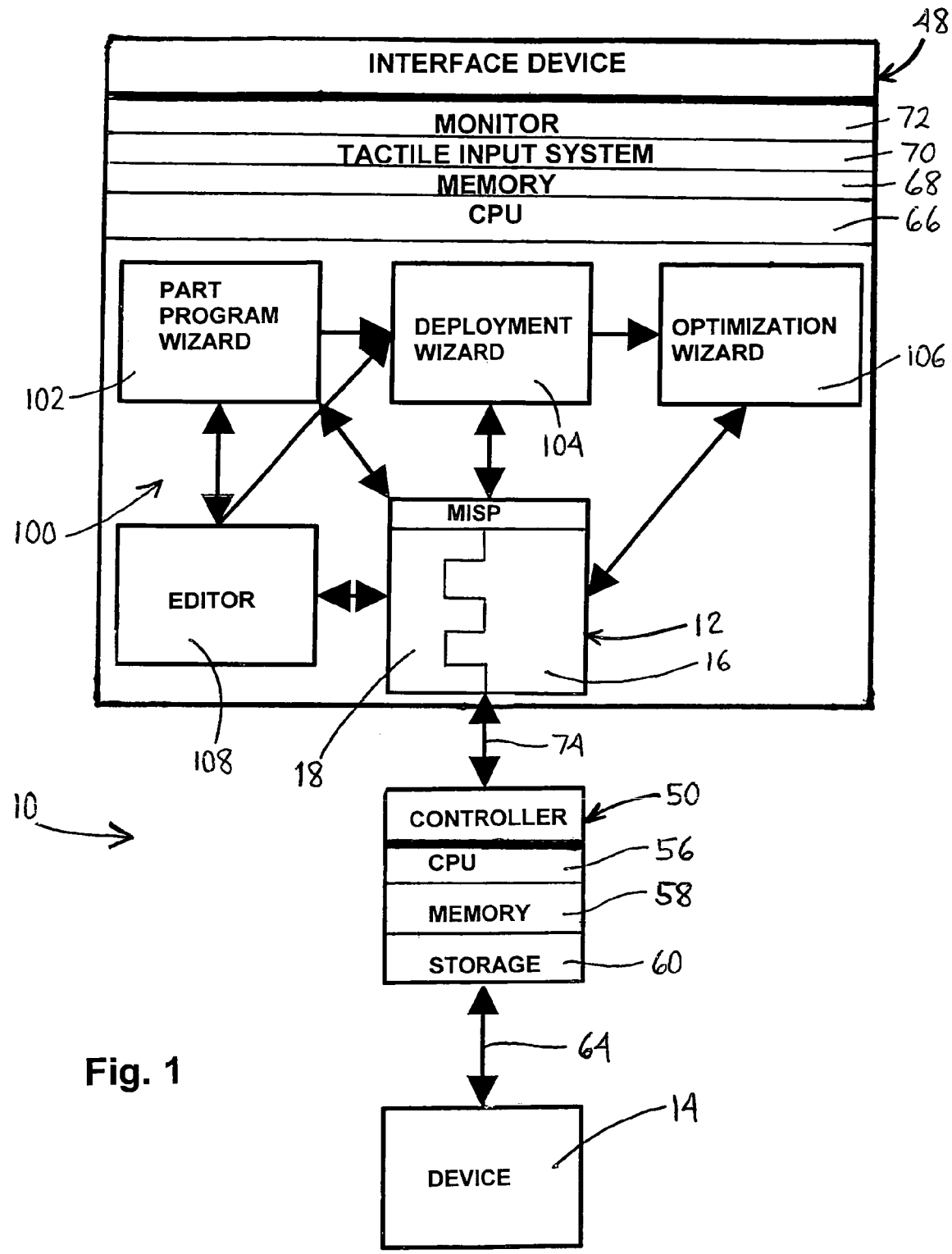
FIG. 1 shows a schematic view of apparatus for developing metadata-infused software programs for controlling a device.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, the present invention is directed to a method and apparatus 10 for developing and executing metadata-infused software programs 12 for controlling a device 14 to perform a desired function or operation. A metadata-infused software program 12 includes a control program 16 comprising control code written in an interpreted language, such a language based on the C programming language. The control program 16 is operable to control the device 14 and is interleaved with metadata 18 to maintain state information of the control program 16 and to give the parts of the control program 16 an appropriate context. For example, the metadata 18 can maintain the 'tested' state of sections of the control program 16, so that a program developer can readily see whether or not he\she has tested all of the sections of the control program 16 and can safely run the control program 16 at full speed. The metadata 18 gives the control program 16 context by marking, for example, which instructions are responsible for particular actions or functions of the device 14.

Figure 2:
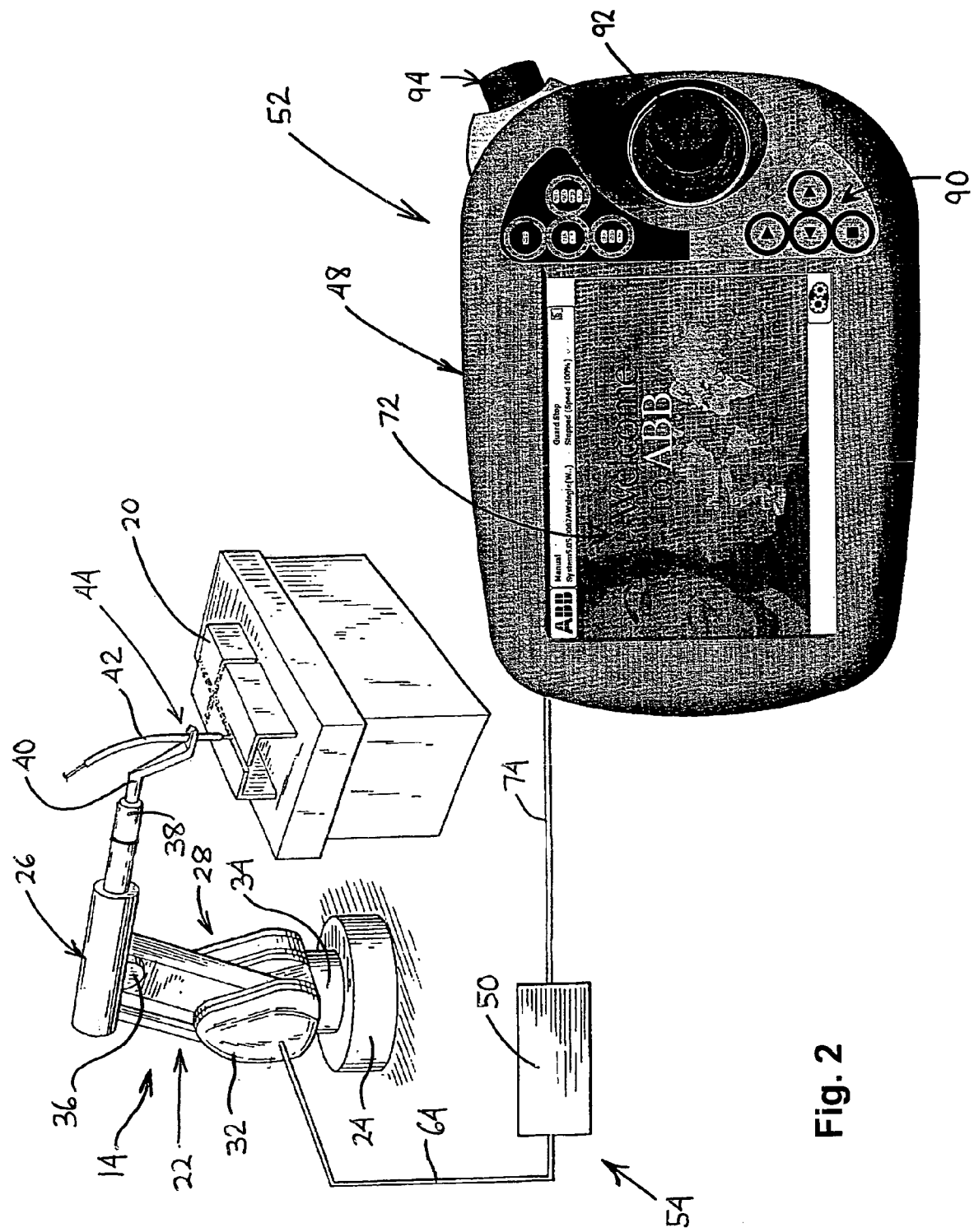
FIG. 2 shows a schematic view of a robot embodiment of the device connected to a teach pendant, which may include an interface device of the apparatus.

In one embodiment of the present invention, the device 14 may be a robotic device for performing the desired operation on a workpiece. More specifically, the device 14 may be a six-axis industrial robot manipulator, as is shown in FIG. 2, and the desired operation may be an industrial robotic operation, such as a cutting, grinding, gluing, painting, deburring, or welding a work piece 20. In such an embodiment, the device 14 generally includes an articulated arm assembly 22 that is mounted to a base 24 and includes upper and lower arms 26, 28. The lower arm 28 is articulated for movement about a shoulder 32 and is connected to the base 24 by a waist 34. The upper arm 26 is connected at an elbow 36 to the lower arm 28 and includes a wrist 38. A grasping mechanism 40 is mounted to the wrist 38 and is configured to receive a tool 42 or other device to be moved by the device 14. The grasping mechanism 40 and the tool 42, or other device mounted to the wrist 38, are together known generally as an end effector (designated by reference numeral 44). The robot arm assembly 22 can be driven by servo motors about axes extending through the waist 34, the shoulder 32 and the elbow 36 (representing three degrees of freedom) to position the wrist 38 and thus the end effector 44 at any desired position within the operating range of the device 14. These positions can be specified in terms of the positions of the end effector 44 on each of the three-dimensional x, y and z axes of a robot Cartesian coordinate system (i.e., [px,py,pz]).

Referring back to FIG. 1, the apparatus 10 for developing and executing a metadata-infused software program 12 generally includes an interface device 48 and a controller 50 for controlling the device 14. If the device 14 is a robot manipulator, the apparatus 10 may also include a teach pendant 52 (shown in FIG. 2) and/or a lead-through teaching device 53 (shown in FIG. 3). In the embodiment where the device 14 is a robot manipulator, the device 14 and the controller 50 together may be referred to as a robot system (designated by reference numeral 54).

The controller 50 includes a central processing unit (CPU) 56, memory 58 and storage 60, such as one or more hard drives. The controller 50 is connected to the device 14, such as by a plurality of cables 64, including a motor power cable, a measurement signal cable and one or more communication cables. The controller 50 is operable to execute a metadata-infused software program 12 to control the operation of the device 14. More specifically, an interpreter running on the CPU 56 identifies the different portions of the control program 16 within a metadata-infused software program 12 and causes these portions to be executed to control the device 14. In an embodiment of the present invention where the device 14 is a robot manipulator, the controller 50 is a robot controller operable to execute a robot user programming language (robot code) to control the operation of the device 14 (robot manipulator). The robot code may, for example, be Karel, KRL or RAPID, all of which are based on the C programming language. In an embodiment of the present invention, the robot code is RAPID, which is used in robotic systems provided by the assignee of the present invention, ABB Inc.

The interface device 48 includes a CPU 66, a memory 68, an input system 70 for inputting information and a monitor or screen 72 for displaying information. An operating system with a graphical user interface (GUI) runs on the CPU 66. In one embodiment of the present invention, the operating system is Microsoft Windows CE. The interface device 48 may be a personal computer (PC) or may comprise a portion of the teach pendant 52 (such as in the embodiment where the device 14 is a robot manipulator). The interface device 48 may be connected to the controller 50 by one or more cables 74 to receive power from the controller 50 and to communicate with the controller 50. It is contemplated, however, that the interface device 48 may also, or alternately, communicate with the controller 50 via radio signals.

In the embodiment of the present invention where the device 14 is a robot manipulator, the teach pendant 52 or the lead through device 53 may be utilized to teach the device 14, which will be discussed in more detail below.

Figure 3:
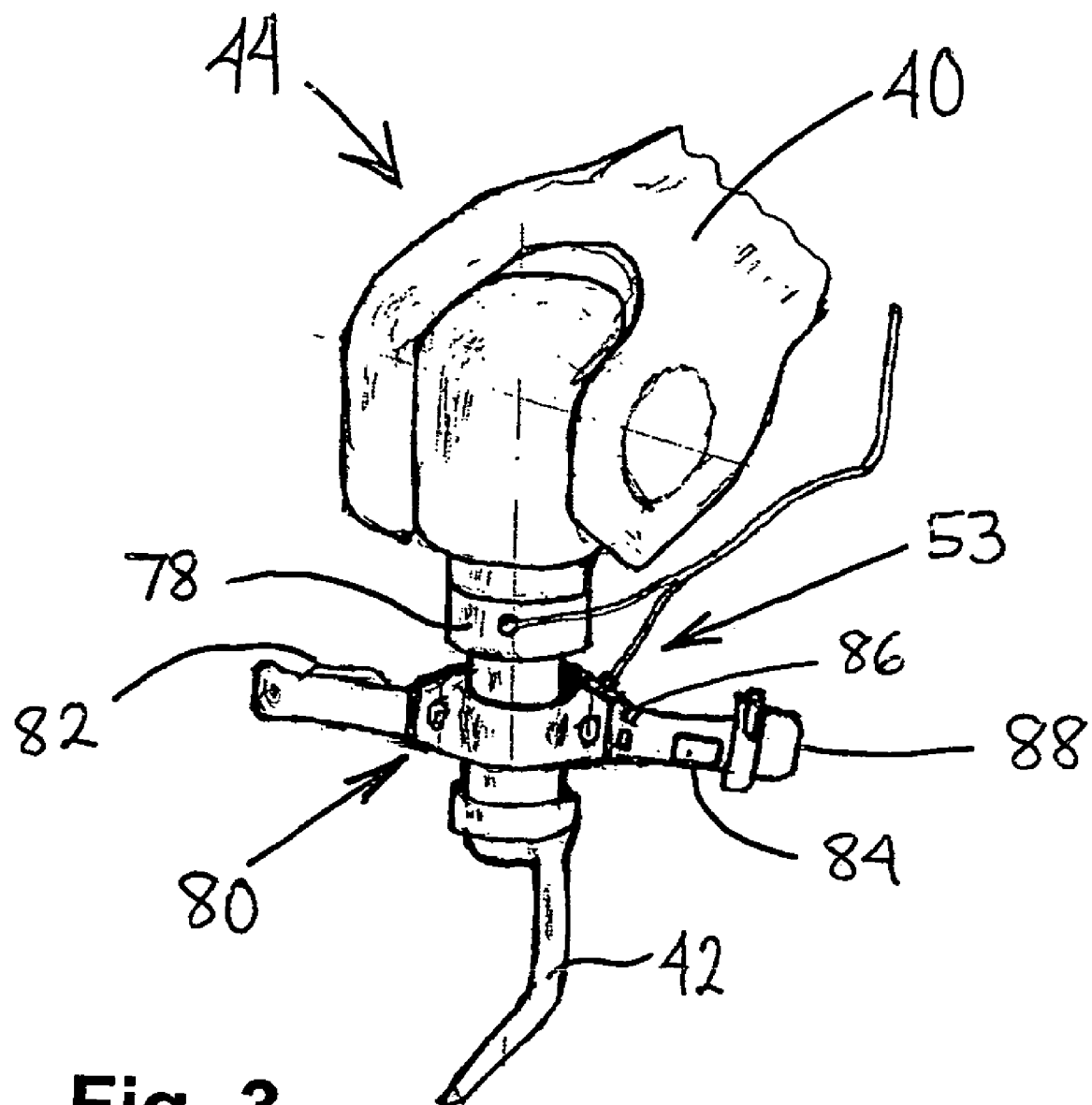
FIG. 3 shows a lead-through device for teaching the robot embodiment of the device.

Referring now to FIG. 3, in the embodiment where the device 14 is a robot manipulator and the lead-through device 53 is provided, the lead-through device 53 is mounted to the end effector 44 and includes one or more force sensors 78 capable of sensing physical force components (both linear and moment) in three or more directions. When the program developer applies physical forces to the end effector 44 (and thus the force sensor(s) 78) to move the end effector 44 along a travel path, the force sensor(s) 78 generate electronic signals representing the physical forces and transmits them to the controller 50. In response to these electrical signals, the controller 50 controls the device 14 to move the end effector 44 in the directions of the physical forces, thereby greatly facilitating the movement of the end effector 44 to the positions in the travel path. Examples of lead-through devices that may be used for the lead-through device 53 include U.S. Pat. No. 4,408,286 to Kikuchi et al., U.S. Pat. No. 5,880,956 to Graf and U.S. patent application Ser. No. 11/051,383 to George Zhang et al., which was filed on Feb. 4, 2005 and is entitled ACCELEROMETER TO MONITOR MOVEMENT OF A TOOL ASSEMBLY ATTACHED TO A ROBOT END EFFECTOR, and which is assigned to the assignee of the present invention. Both the Kikuchi et al. '286 patent and the Zhang et al. patent application are hereby incorporated by reference.

In the embodiment where the lead-through device 53 is embodied in accordance with the Zhang et al. patent application, the lead-through device 53 further includes a lead-through handle assembly 80 (as shown in FIG. 3). The handle assembly 80 includes: a) a three-position deadman switch and E-stop button 82 as used on a robot teach pedant to meet robot jogging safety requirements (*American National Standard for Industrial Robot and Robot system—Safety Requirements* ANS/RIA R15.06-1999); b) an accelerometer 84 built in the handle and integrated into the robot safety circuitry to monitor the movement of the end effector 44; c) buttons 86 that are used as triggers to communicate with the controller 50; and d) a 6-D space mouse 88 utilized as an additional lead-through sensor input besides the force sensor(s) 78 to lead the device 14 (robot manipulator) in longer distance jogging or to replace the force sensor(s) 78 in lead-through teaching. Buttons are also built on the space mouse 88 to duplicate the triggers provided by buttons on the handle bar. Translation and rotation frames for both the force sensor(s) 78 and space mouse 88 are mapped with the robot tool frame to achieve intuitive leading-through teaching. Using the accelerometer 84 during lead-through teaching allows the robot safety circuitry to be triggered to prevent further movement of the device 14 if the acceleration exceeds a predetermined value.

In the embodiment where the device 14 is a robot manipulator and the teach pendant 52 is provided, the teach pendant 52, may include the interface device 48, as well as one or manual actuation devices, which may be a joystick or a plurality of jog switches or buttons. Referring back to FIG. 2, the teach pendant 52 is shown as including the interface device 48 and having a joystick 92. The teach pendant 52 is adapted to be hand-held and portable. More specifically, the teach pendant 52 is compact in size, light in weight and is connected to the controller 50 by the cables 74, which have an extended length. In this manner, a program developer may be located a safe distance from the device 14 when teaching the device 14.

The joystick 92 is located toward a first side of the teach pendant 52, while the screen 72 is located toward a second side of the teach pendant 52. The screen 72 is a touch screen for inputting information. The screen 72 and keys 90 comprise the input system 70. It should be appreciated that the input system 70 could also include a voice activation system for inputting information. An enlarged emergency stop push button 94 extends from the first side and is located above the joystick 92. Inside the teach pendant 52, transducers (not shown) are positioned to sense movement of the joystick 92. The transducers convert the movement of the joystick 92 into electronic signals. The electronic signals are transmitted over the cables 74 to the controller 50, which controls the movement of the device 14 in accordance with the electronic signals. Particular movements of the joystick 92 generate electronic signals that cause particular movements of the device 14. For example, deflection of the joystick 92 may generate electronic signals that cause movement of the end effector 44 in an X-Y plane, while rotation of the joystick 92 may generate electronic signals that cause movement of the end effector 44 in a Z plane. Examples of teach pendants that may be used for the teach pendant 52 include U.S. Pat. No. 4,589,810 to Heindl et al. and U.S. Pat. No. 5,790,401 to Shields, which are hereby incorporated by reference.

Figure 4:
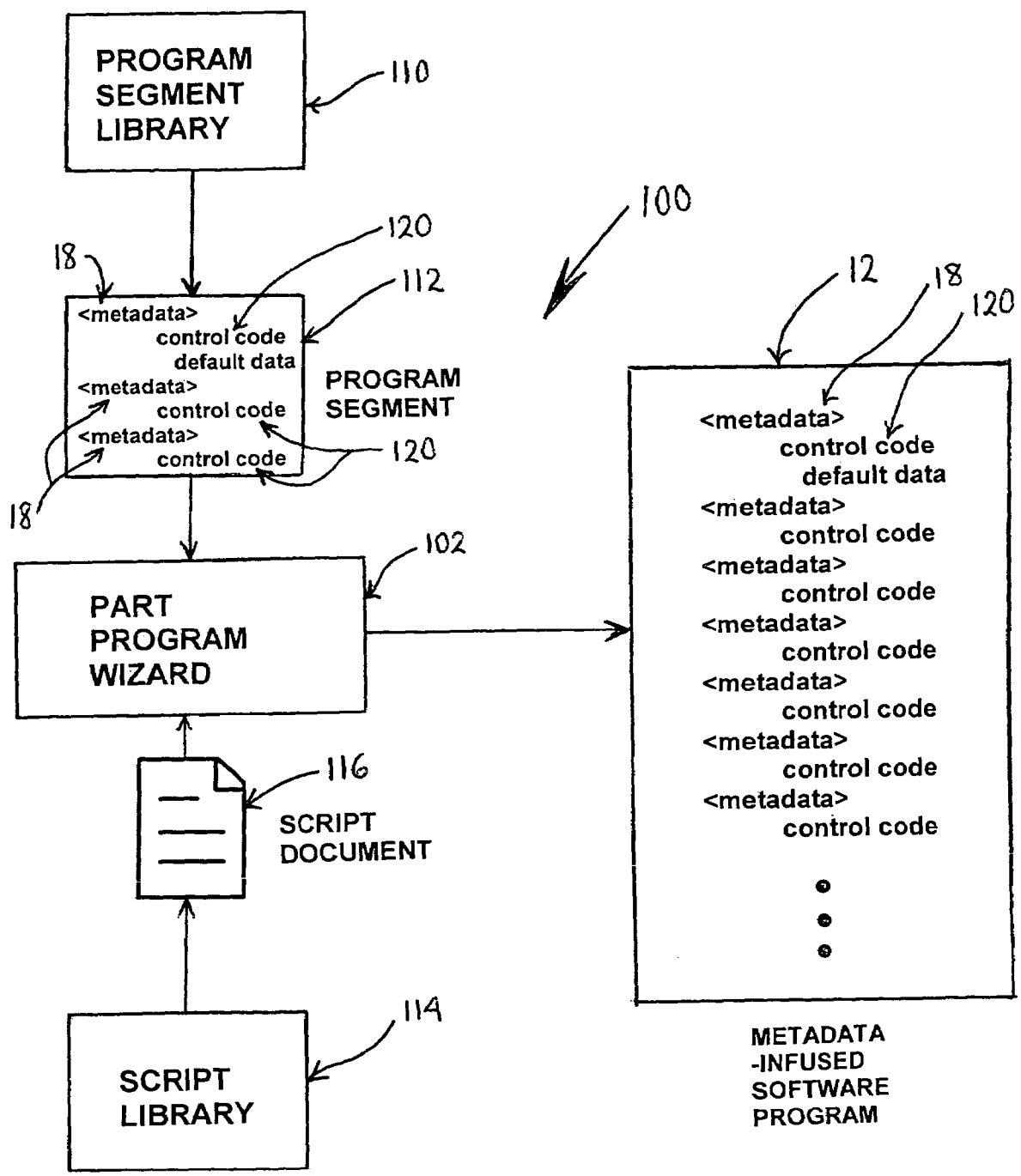
FIG. 4 shows a schematic view of a portion of a development application that runs on the interface device of the apparatus.

Referring back to FIG. 1 and now also to FIG. 4, an application suite 100 runs on the CPU 66 of the interface device 48 and is operable to generate the metadata-infused software programs 12. The application suite 100 includes a part program wizard 102, a deployment wizard 104, an optimization wizard 106 and an editor 108. In one embodiment of the present invention, the application suite 100 is written in C# using Microsoft Visual Studio.net. One or more libraries 110 of actions or program segments 112 and one or more libraries 114 of script documents 116 are retained in the storage 60 of the controller 50, the memory 68 of the interface device 48, or another accessible storage location. The part program wizard 102 utilizes the libraries 110, 114 to generate an initial version of a metadata-infused software program 12, which is then modified by the deployment wizard 104 to include taught information. If required or desired, the metadata-infused software program 12 is optimized by the optimization wizard 106 and/or edited by the editor 108. In this regard, the meaning of the term "develop" and all variations thereof, when used in the context of a metadata-infused software program 12, includes the construction of a metadata-infused software program 12 using the part program wizard 102, as well as the modification of a metadata-infused software program 12 using the deployment wizard 104 and/or the editor 108.

In the embodiments where the device 14 is a robot manipulator, the 5metadata-infused software programs 12 are typically part programs within a larger mainline program for the device 14.

Each program segment 112 comprises metadata 18 and one or more sections 120 of control code (such as RAPID) that are executable by the controller 50 to perform a function, or action. If the control code is robot code, the control code sections 120 include data declarations. Exemplary functions or actions performed by execution of the control code sections 120 include making calculations, communicating with other programs and data sources, and instructing the device 14 to perform certain operations. For example, in the embodiment where the device 14 is a robot manipulator, the control code sections 120 includes instructions for moving the end effector 44, such as instructions for moving the end effector 44 along a path that includes approach positions toward the work piece 20 and departure positions away from the work piece 20. The coordinates for the approach positions and the departure positions have default values that are replaced by actual values during the teaching of the metadata-infused software program 12, as will be more fully described below.

Referring now to FIG. 5, each program segment 112 is represented in a mark-up language. A mark-up language is a language that describes the structure of a document. Mark-up languages generally conform to a model that is similar to a database schema. The most well-known examples of markup languages are the Standard Generalized Mark-up Language (SGML) and all of its variants, including Hypertext Markup Language (HTML) and Extensible Markup Language (XML). In one embodiment of the present invention, each program segment 112 is represented in XML.

Each program segment 112 includes a plurality of mark-up language elements. Each element has a name and represents, or contains one or more control code sections 120 for performing the action of the program segment 112 and/or information about the action, i.e., metadata 18. More specifically, in each program segment 112, a parent element 122 (which may be named "Action") is provided for the action performed by the program segment 112, along with a plurality of child elements 124 that include control code sections 120. The parent element 122 has the status of the action of the program segment 112, e.g., "executed" or "taught", as an attribute 126. One of the child elements 124a (which may be named "Description") may include a description of the action of the program segment 112, e.g., "This path attaches the upper bracket to the flange". The child element 124a may also include instructions for teaching the action, e.g. "Teach the weld points so they are about 1 mm from . . . ". Another child element 124b (which may be named "ToolName") may provide the name of the tool (such as tool 42) being used to perform the action of the program segment 112, e.g. "tWeld-Gun". Still another child element 124c (which may be named "Approach Points") may contain a control code section 120 for moving the end effector 44 to approach positions. Yet another child element 124d (which may be named "DepartPoints") may contain a control code section 120 for moving the end effector 44 to departure positions. If required by the syntax requirement of the mark-up language utilized (such as XML), each element has a closing tag. In addition, the elements, are nested, with the closing tag of the parent element 122 being last, the closing tag of the first child element being second last, etc.

The metadata 18 of a program segment 112 is interpreted by an XML interpreter of the GUI of the interface device 48 to generate a graphical representation of the program segment 112 for display on the monitor 72 of the interface device 48. The description of the action, the attributes (such as the status of the action) and the names of the elements are all metadata 18 that provide the status and context of the program segment 112.

The script documents 116 are also in a mark-up language, such as XML. Each script document 116 is for a particular device operation and functions as a guide or script for developing a metadata-infused software program 12 for a particular application. More specifically, each script document 116 contains embedded references to program segments 112 in one or more libraries 110 and includes a series of queries for eliciting information from the program developer to build a metadata-infused software program 12. In response to the queries, the program developer enters information into the program script 116 through the input system 70. The part program wizard 102 utilizes the script document 116, including the entered information and the embedded library references, to retrieve appropriate program segments 112 from the one or more libraries 110 and to combine them to form a main body of the metadata-infused software program 12. Using information from the script document 116, the part program wizard 102 adds an appropriate header and footer to the main body to complete the metadata-infused software program 12. The header, for example, may include a mark-up language declaration, such as "<?xml version="1.0"?>", which would signify that the metadata-infused software program 12 conforms to the 1.0 specification of XML.

The part program wizard 102 allows the program developer to easily create a metadata-infused software program 12 so as to fulfill the program developer's needs for a particular operation, while taking advantage of the embedded process knowledge and isolating the program developer from the control program 16. The part program wizard utilizes a selected script document 116 to ask the program developer a set of simple questions about the process that the program developer can readily answer and then creates an initial version of the metadata-infused software program 12. The initial version is complete except that the program data for items such as positions are set to nominal values.

Figure 6:
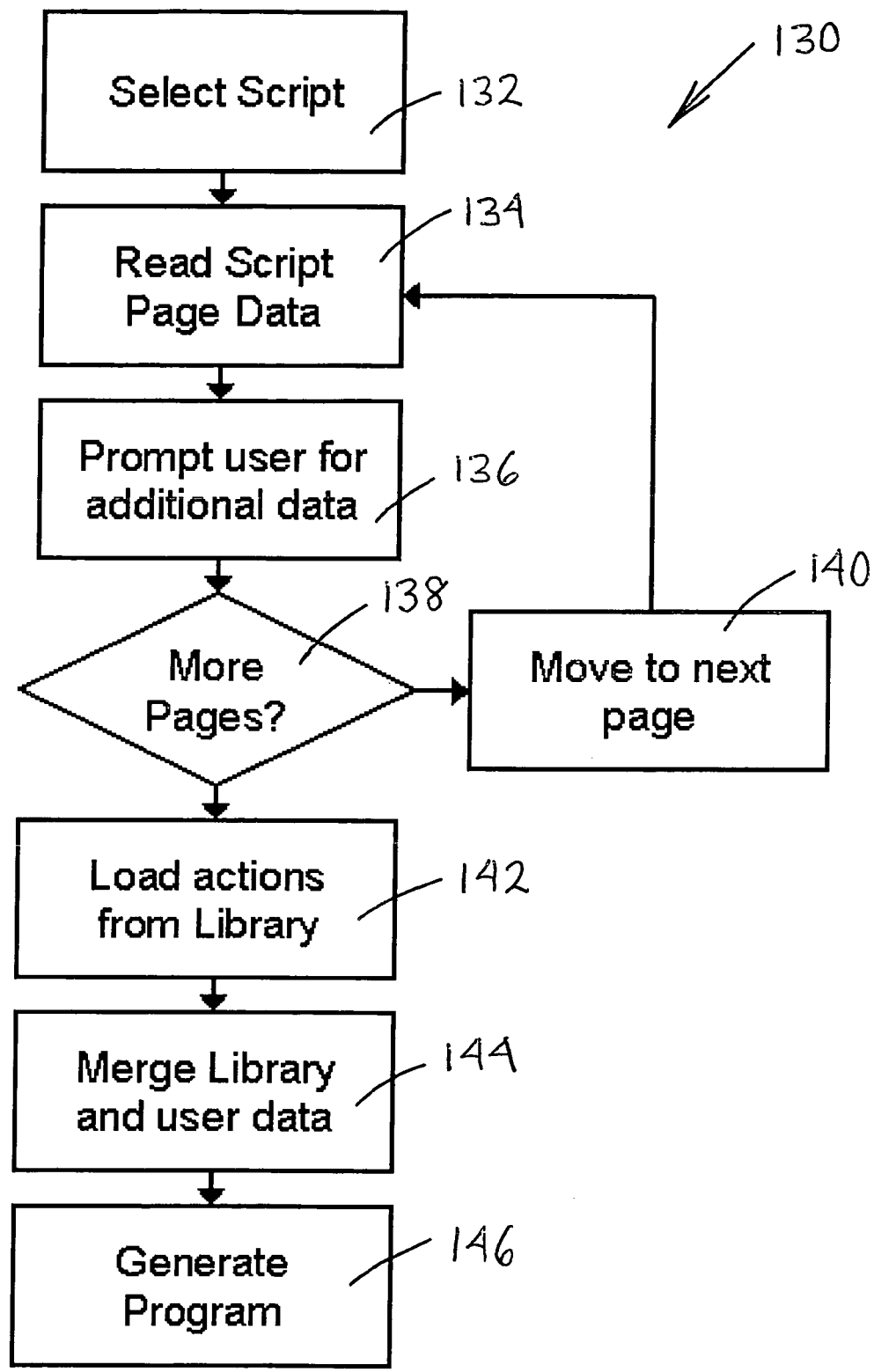
FIG. 6 shows a flowchart for a part program wizard of the development application.

FIG. 6 shows a typical flowchart 130 for part program wizard 102. In this example, the program developer starts the part program wizard 102, and at step 132 selects a particular script document 116. Each script document 116 can be generic to a process or customized as needed to a particular installation. The part program wizard 102 at step 134 reads each step in the script document 116 which instructs the part program wizard 102 to insert one or more instructions and data. The step data defines whether to insert the information automatically or as is shown at step 136 to prompt the program developer for additional data before inserting it. Examples of additional user data include, but are not limited to, such items as the new program name, a relevant description for a particular group of paths, the process parameters (such as weld type, spindle speed, or paint thickness) to be applied to a process path, which tool to use for a particular action, or in which order to place the available actions. The part program wizard 102 at step 138 checks to see if there are further pages in the script document 116. If the answer at step 138 is "yes", the part program wizard 102 proceeds to step 140 where the part program wizard 102 moves to the next page of the script document 116 and then returns back to step 136. If the answer at step 138 is "no", the part program wizard 102 uses the entered data and the embedded library references in the script document 116 to load the appropriate program segments 112 from the one or more libraries 110 in step 142. The part program wizard 102 then merges the program segments 112 and the entered data in step 144 and subsequently generates the initial version of the metadata-infused software program 12 in step 146. If the device 14 is a robot manipulator and the control code is robot code (such as RAPID), this merging of the program segments 112 includes relocation of the data declarations within the program segments 112. More specifically, the part program wizard 102 extracts the data declarations from the program segments 112 and moves the data declarations to the beginning of the metadata-infused software program 12 under construction so as to be in accordance with the robot code programming protocol.

Figure 7:
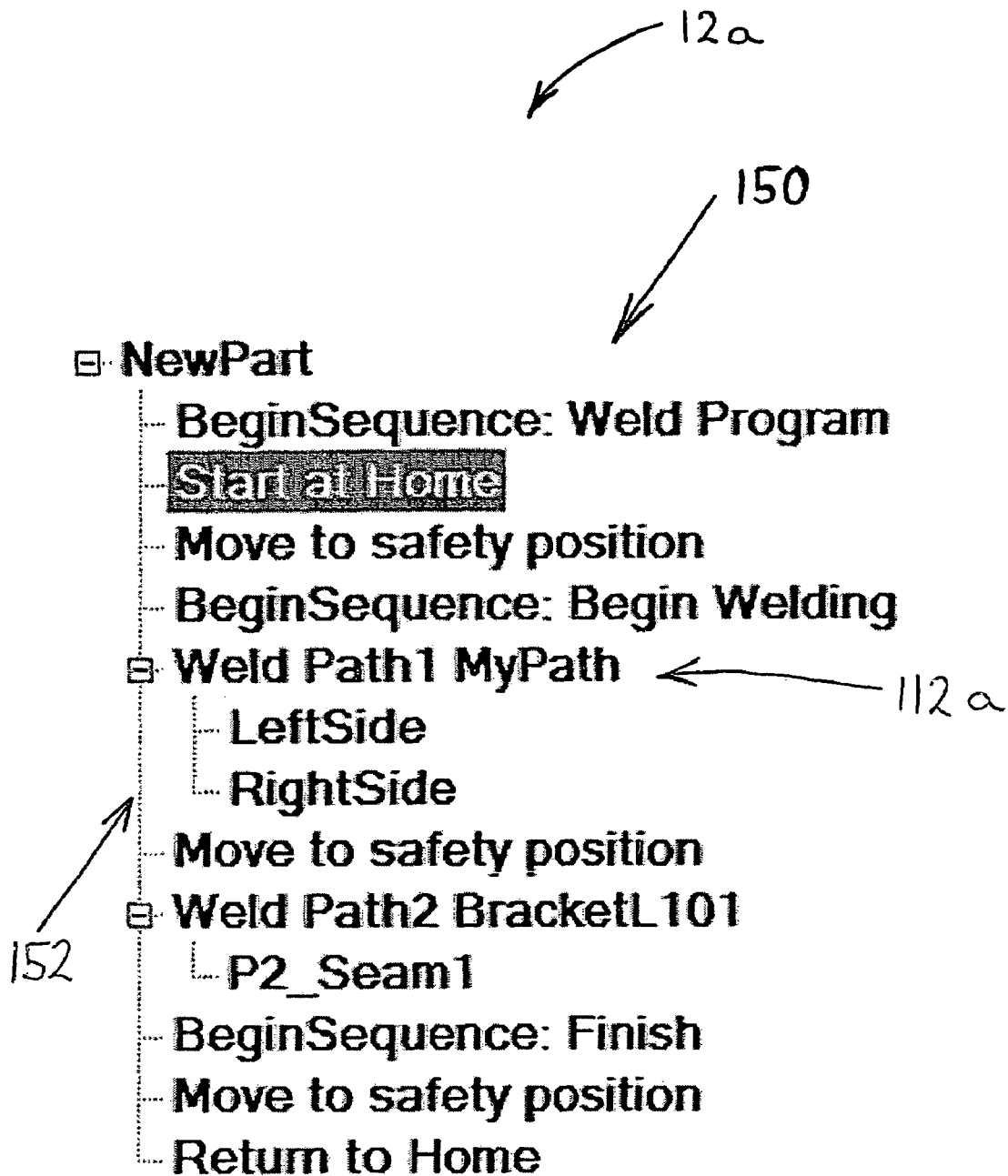
FIG. 7 shows a portion of a graphical representation of a metadata-infused software program in the part program wizard.

A portion of a graphical representation 150 of a metadata-infused software program 12a generated by the part program wizard 102 is shown in FIG. 7. The metadata-infused software program 12a is for a welding process to be performed by the robot system 54. The graphical representation 150 is displayed on the screen 72 of the interface device 48, where it may be viewed by the program developer. The graphical representation 150 has a hierarchical tree structure 152 that represents the metadata-infused software program 12a as a sequence of actions or tasks. More specifically, the graphical representation 150 has one or more descriptors for each program segment 112 that has been added from the library 110. For example, a program segment 112a has a main descriptor, namely "Weld Path 1 MyPath" and a pair of sub-descriptors, namely "LeftSide", "RightSide", for actions within the program segment 112a, respectively. Underneath the graphical representation 150 is the actual control program 16 in the normal control language with embedded metadata 18 to provide the information necessary for the graphical representation 150 on the screen 72 of the interface device 48.

Once a metadata-infused software program 12 has been generated, the deployment wizard 104 is utilized. The deployment wizard 104 is an engine that operates on a metadata-infused software program 12 to guide the program developer through the "teaching" of the device 14, which is really the teaching of the metadata-infused software program 12. The deployment wizard 104 can be used on a newly created metadata-infused software program 12, or a stored metadata-infused software program 12 that was previously created for the same or a different application. The metadata-infused software program 12 is "taught" in the sense that the initial version of the metadata-infused software program 12 is modified so as to be operable to control the device 14 to actually perform the desired operation. In the simplest cases, the program developer merely needs to teach path positions for a travel path of the device 14. For example, in the embodiment where the device 14 is a robot manipulator and the desired operation involves a travel path that extends along approach and departure positions, the approach and departure positions in the initial version of the metadata infused software program 12 still have the default coordinate values (from the program segments 112), which have to be replaced with the actual coordinate values during the teaching of the metadata-infused software program 12.

In the embodiment where the device 14 is a robot manipulator, the teaching of the metadata-infused software program 12 is accomplished using the lead-through device 53 or the teach pendant 52. Using either teaching device, the end effector 44 is moved to each of the approach and departure positions along the travel path. At each of the approach and departure positions, the actual coordinates of the position are entered into the metadata-infused software program 12 and replace the default coordinate values that previously existed for the position.

Figure 8:
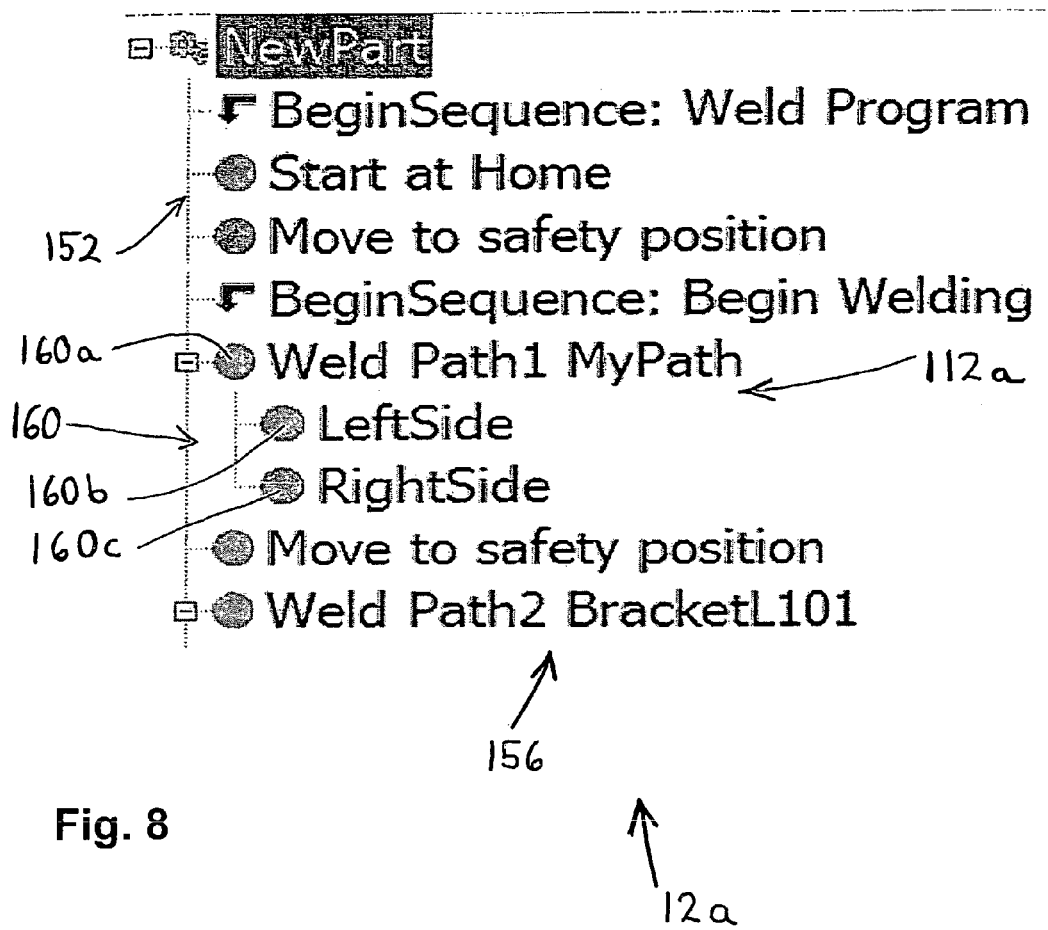
FIG. 8 shows a portion of a graphical representation of a metadata-infused software program in a deployment wizard.

Referring now to FIG. 8, there is shown a portion of a graphical representation 156 of the metadata-infused software program 12*a* in the deployment wizard 104. As with the graphical representation 150 in the part program wizard 102, the graphical representation 156 in the deployment wizard 104 has the hierarchical tree structure 152 with the descriptors and sub-descriptors. In addition, the graphical representation 156 includes graphic symbols 160 (such as circles and bent arrows) for displaying the statuses of the program segments 112. More specifically, the colors and/or shapes of the graphic symbols 160 convey the statuses of the program segments 112. For example, the program segment 112*a* has a graphic symbol 160*a* for displaying the overall status of the program segment 112*a* and graphic symbols 160*b*, 160*c* for displaying the statuses of the actions within the program segment 112*a*, respectively. With the hierarchical arrangement of the tree structure 152, the overall status of a program segment 112 (such as program segment 112*a*) is the lowest status of the actions within the program segment 112. For example, if the status of the action "LeftSide" (as displayed by graphic symbol 160*b*) is not taught or executed, while the status of the action "RightSide" (as displayed by graphic symbol 160*c*) is taught and executed, the overall status of the program segment 112*a* (as displayed by graphic symbol 160*a*) will be not taught or executed. When a program segment 112 has not been taught or executed, the corresponding graphic symbol 160 is white, whereas when the program segment 112 has been taught the corresponding graphic symbol 160 has a yellow color. When the program segment 112 has been taught and executed, the corresponding graphic symbol 160 has a green color. With the graphic symbols 160, a program developer can tell, at a glance, which portions of the metadata-infused software program 12 have been taught and/or executed.

Figure 9:
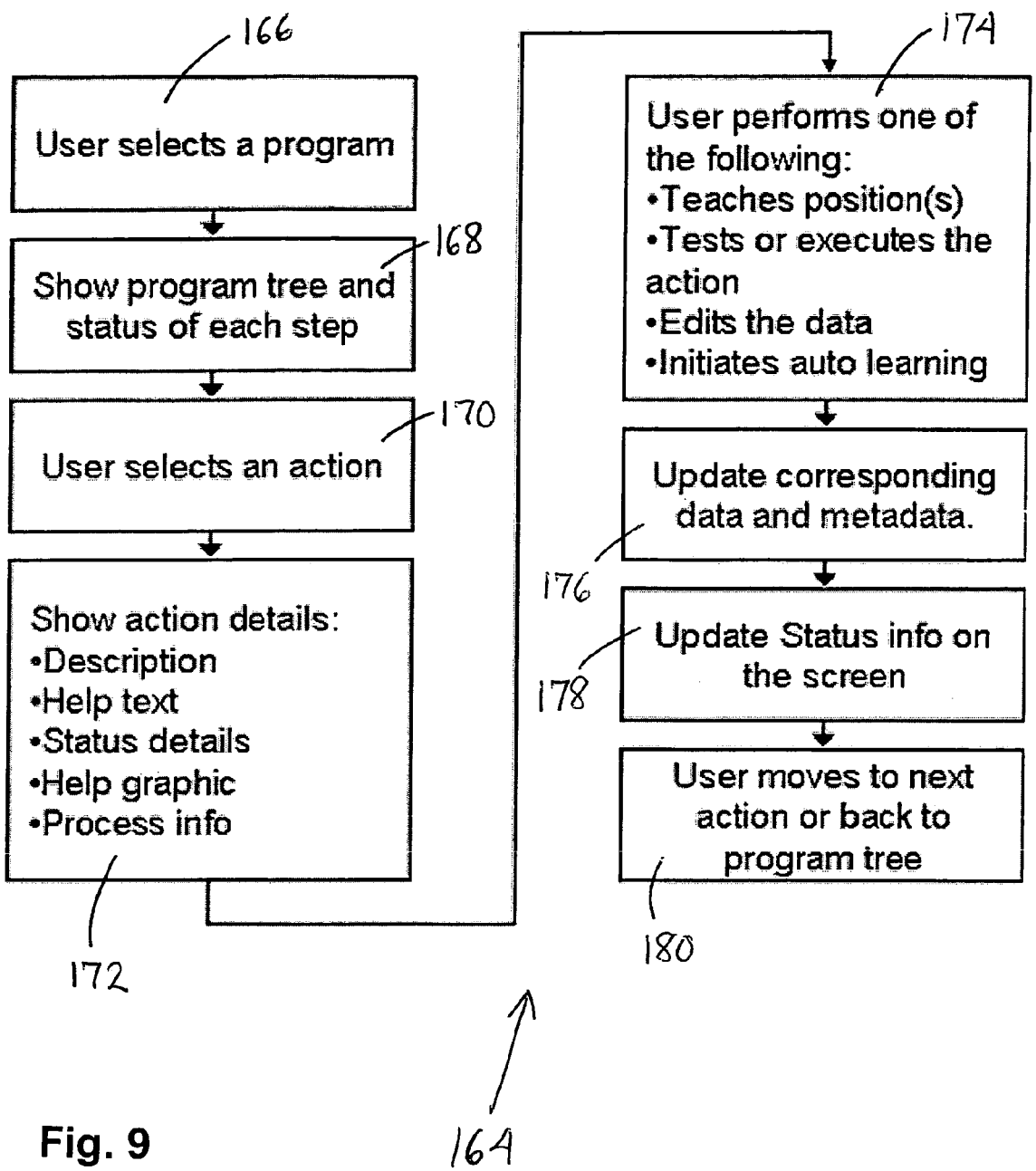
FIG. 9 shows a flowchart for the deployment wizard.

FIG. 9 shows a flowchart 164 for a typical sequence of actions a program developer may encounter when using the deployment wizard 104. It should be noted, however, that the deployment wizard 104 does not require the program developer to follow any particular sequence. In the deployment wizard 104, the program developer first selects a metadata-infused software program 12 at step 166. At step 168, the deployment wizard 104 causes the display of the tree structure 152 and the status of each program segment 112 (action) in the selected metadata-infused software program 12. At step 170, the program developer selects an action and at step 172 the deployment wizard 104 causes the display of the details of the action, such as, for example, description, help text, status details, help graphic and process information. At step 174, the program developer is prompted to perform one of a predetermined number of activities for the selected action. The activities may, for example, be either teaching the position, or testing or executing the action, or editing the data or initiating auto learning.

At step 176, the deployment wizard 104 updates the corresponding data and metadata 18 for the activity performed at step 174. At step 178, the deployment wizard 104 updates the status information on the screen 72 of the interface device 48 for the performed activity. At step 180, the program developer either moves to the next action or back to the program tree to select another metadata-infused software program 12.

The metadata 18 within a metadata-infused software program 12 contains information about the order in which positions of a process should be taught, which may not necessarily be the order in which they are performed. For example, when programming a sequence that picks up or drops off a part, it is common for a programmer to teach the pick position first, then back up in the program and teach the approach positions second, because the approach positions that the robot must travel through are often dependent on the pick positions, such as when a desired part must be placed into or drawn out of a fixture. In such an instance, the metadata 18 contains instructions that the pick position should be taught before the approach positions. The deployment wizard 104 uses this metadata 18 to display the instructions to a program developer. In this manner, the deployment wizard 104 leads the program developer through the process in the order in which it should be taught, rather than the order in which it is performed. This type of use of metadata also allows steps to be skipped entirely.

Figure 10:
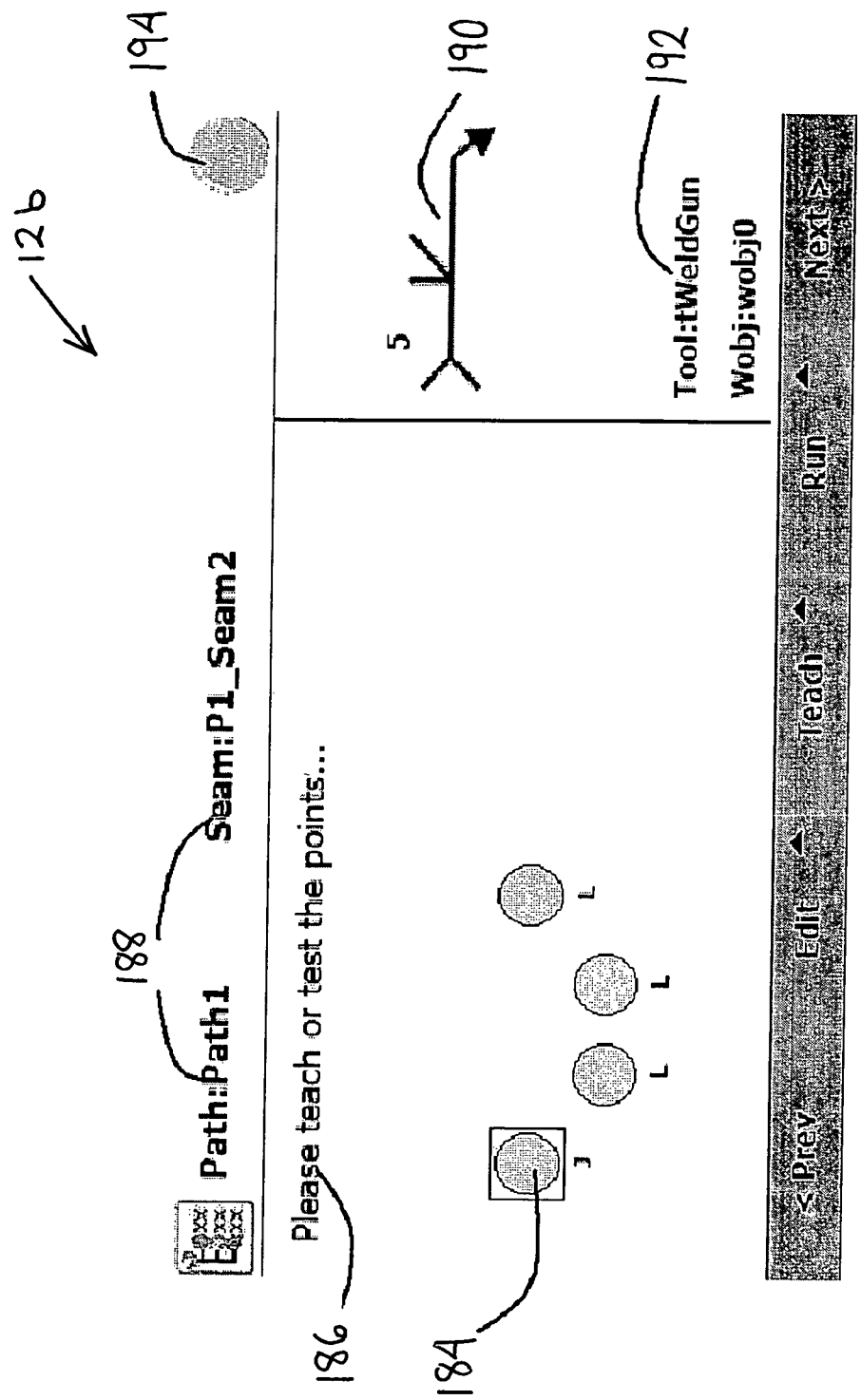
FIG. 10 shows a portion of a graphical representation of a second metadata-infused software program in the deployment wizard.

FIG. 10 shows the deployment wizard 104 being used on another metadata-infused software program 12*b*, which is for an arc welding process to be performed by the robot system 54. The arc welding approach, process, and departure positions are represented by graphic symbols 184, which may be circles (as shown), squares, or other shapes. The color of each of the graphic symbols 184 conveys the status (taught) of the corresponding path position. More specifically, if a path position has not been taught and has not been executed, the corresponding graphic symbol 184 has a white color, whereas when the position has been taught, the corresponding graphic symbol 184 has a yellow color and when the position has been taught and executed, the corresponding graphic symbol 184 has a green color. Also shown is instructional text 186 for the program developer, the current path and seam being programmed 188, the current weld data collection 190 for the seam, the current tool and work object coordinate system 192, and a graphic symbol 194 that conveys the overall status of the seam. In this case, the program developer teaches each path position and then tests the seam movements before proceeding on to the next step in the process.

Figure 11:
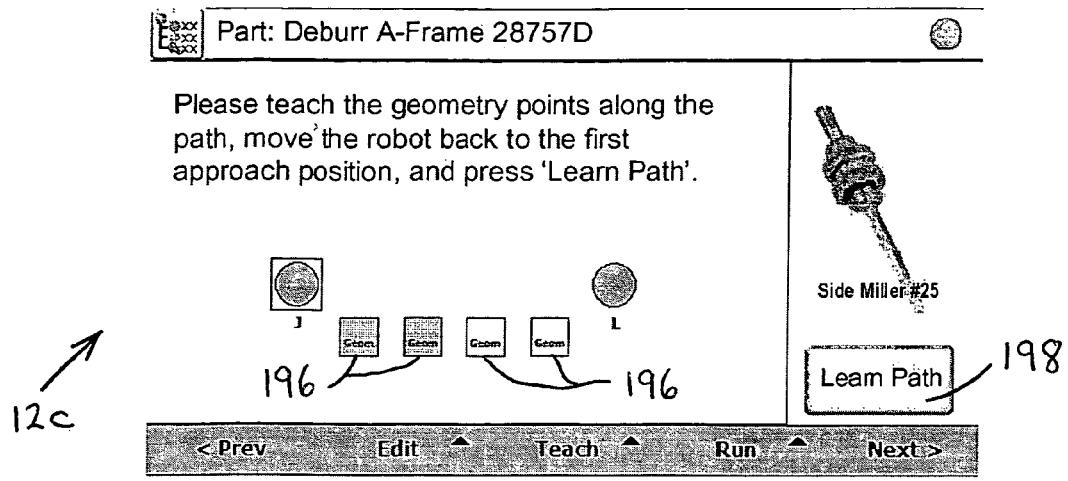
FIG. 11 shows a portion of a graphical representation of a third metadata-infused software program in the deployment wizard.

FIG. 11 shows the deployment wizard 104 being used on another metadata-infused software program 12*c*, which is for a deburring process to be performed by the robot system 54. In this example, the program developer is being directed to teach a set of positions that are not actual process positions, but rather serve as guides for the robot system 54 itself to find and record the actual process positions. By teaching geometry positions (as represented by graphic symbols 196) and then pressing a 'Learn Path' button 198, the program developer causes the robot system 54 to utilize the positions designated by the metadata 18 as 'geometry' positions as guides in searching for and recording process positions for a deburring path. In this manner, a program developer may only need to teach a few positions for a process path that contains many positions.

Figure 12:
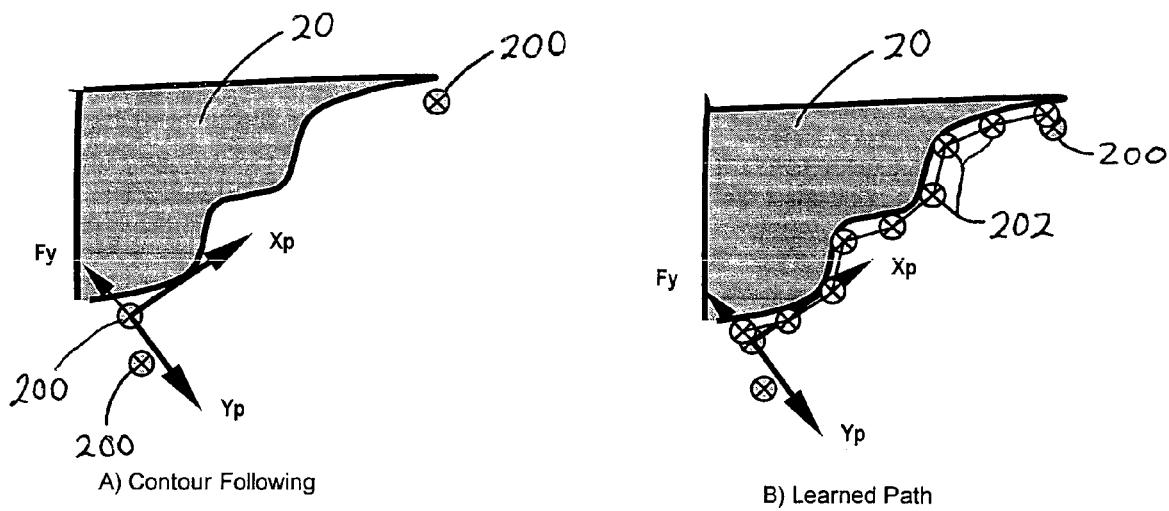
FIG. 12 shows a schematic representation of the teaching of the robot embodiment of the device, which is controlled by a fourth metadata-infused software program, wherein an end effector is following the contour of a work piece.

FIG. 12 shows an example of robot intelligent behavior utilized by the deployment wizard 104 to assist in process position assignment for another metadata-infused software program 12*d*, which is for a process to be performed by the robot system 54. In this example, a primitive behavior built on force control technology, namely contact behavior, is used in the deployment step for path teaching. This primitive behavior not only guarantees stable contact between the tool 42 and the work piece 20, but also keeps them in constant contact so that the movement of the end effector 44 duplicates the actual process path in the real process. The metadata 18 in the metadata-infused software program 12d is used to distinguish between positions (represented by graphic symbols 200) that the program developer teaches to initially guide the robot system 54 (FIG. 12A) and positions (represented by graphic symbols 202) that the robot system 54 itself learns (FIG. 12B) as the end effector 44 moves along the process path. In this method, a complex process path, which in most cases would consist of hundreds of process positions, is automatically assigned working values for the real environment.

After a metadata-infused software program 12 is taught and tested (executed), the program developer may run the optimization wizard 106 on the metadata-infused software program 12. The optimization wizard 106 uses the context given by the metadata 18 to make suggestions to the program developer for improvements to the current process. FIG. 13 shows the optimization wizard 106 providing a suggestion for a metadata-infused software program 12e, which is for an arc welding process to be performed by the robot system 54. The optimization wizard 106 recognizes that a high position accuracy for a particular move command may not be necessary, and therefore suggests to the program developer that he/she can decrease the position accuracy. A lower required position accuracy allows the device 14 (robot manipulator) to maintain a higher speed and, thus, improves the performance of the device 14 by lowering the overall cycle time. The optimization wizard 106 can also examine the experiential data gathered by the robot system 54 during its operation and guide the program developer in optimizing other aspects of a metadata-infused software program 12, such as timing of operations, the sequence of actions, or the speed of the movements, among many others.

Figure 14:
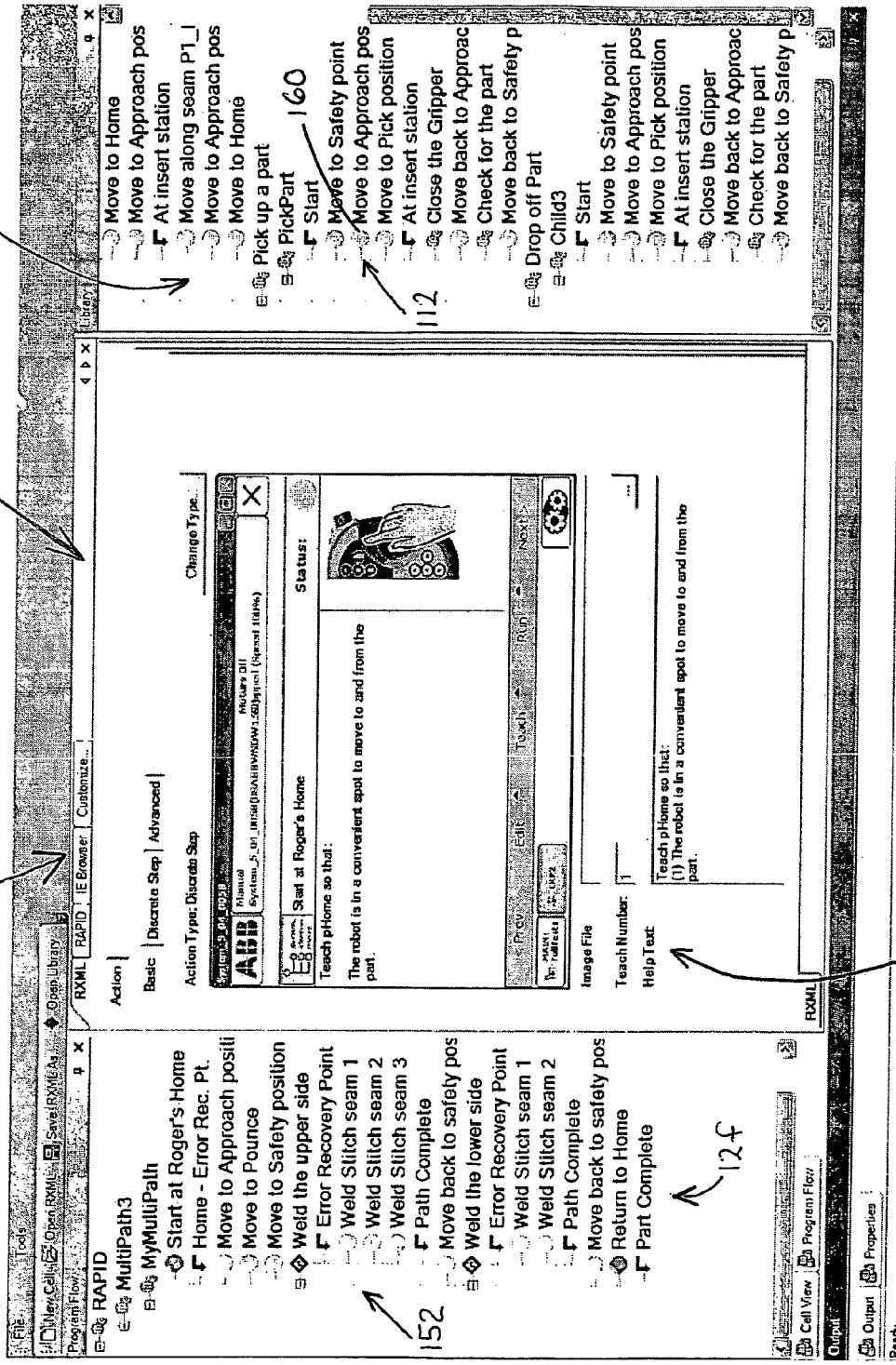
FIG. 14 shows a screen display of an editor of the development application being used on a sixth metadata-infused software program.

For a number of reasons, the program developer may wish to change the various aspects of his\her metadata-infused software program 12. FIG. 14 shows a view 204 on the screen 72 of the interface device 48, wherein the editor 108 is being used to edit a metadata-infused software program 12f for another arc welding process. The editor 108 allows the program developer to change the control program 16 and data along with the appropriate metadata 18 while maintaining a valid program and metadata structure. One exemplary use of the editor 108 is for the program developer to create a new metadata-infused software program 12 (or load an existing metadata-infused software program 12) and then add, delete, or select program segments 112 in the tree structure 152, update in each program segment 112, the control code sections 120, the description of the action(s), and help text for the program developer, then save the metadata-infused software program 12. That same metadata-infused software program 12 could then be used by a lesser knowledgeable program developer in the deployment wizard 104, allowing him\her to expertly teach a robot or other device in a particular process-with no exposure to the underlying control program 16.

As shown in FIG. 14, the view 204 has a first section containing the tree structure 152 of the metadata-infused software program 12f, a second section containing a text editor 206 section and a third section containing a graphical representation 208 of a library 110. The text editor 206 may be used to edit (add, delete, modify) metadata 18, such as help text identifying an action or explaining its function. The text editor 206 may also be used to edit the program code (such as the robot code). In the embodiment where the interface device 48 is a PC, a program segment 112 may be added to the metadata-infused software program 12f by clicking on a descriptor and/or graphic symbol 160 of a desired program segment 112 in the graphical representation 208 of the library 110, dragging the descriptor and/or graphic symbol 160 across the second section of the view 204 and dropping the descriptor and/or graphic symbol 160 in an appropriate location within the tree structure 152. Such dragging and dropping of program segments 112 into the metadata-infused software program 12f greatly simplifies the modification of the metadata-infused software program 12f.

Figure 15:
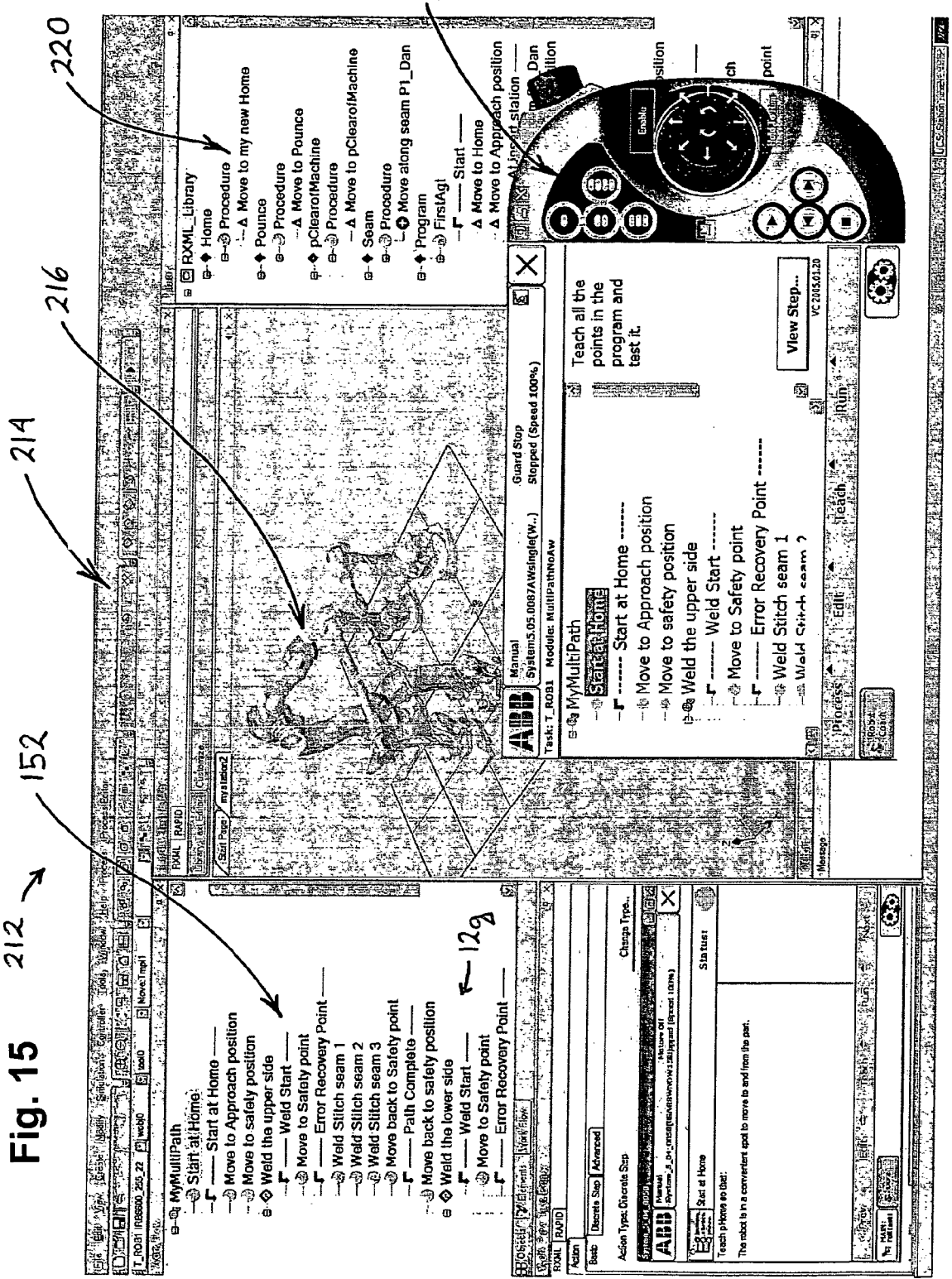
FIG. 15 shows a screen display of a robot programming and simulation application.

In an embodiment of the present invention where the interface device 48 is a PC, the application suite 100 may be a component of a robot programming and simulation (RPS) application 212, which runs on the interface device 48. The RPS application 212 is operable to develop, test and simulate the operation of a robot program. The RPS application 212 includes a virtual controller and a virtual teach pendant, which are identical (in operation) to the controller 50 and the teach pendant 52, respectively. A view 214 generated by the RPS application 212 on the screen 72 of the interface device 48 is shown in FIG. 15. The view 214 includes a dynamic robot graphic 216, a teach pendant graphic 218 for the virtual teach pendant, the tree structure 152 for a metadata-infused software program 12g, and a graphical representation 220 of a library 110. The robot graphic 216 represents one or more robots that are to be controlled. As in the view 204, program segments 112 in the library 110 may be added to the metadata-infused software program 12g by dragging and dropping. The application suite 100 may be accessed through the teach pendant graphic 218, or through a menu (not shown).

A metadata-infused software program 12 (such the metadata-infused software program 12g) may be generated, modified and/or taught in the RPS application 212 using the application suite 100 and then run on the controller 50, or on the virtual controller. When a metadata-infused software program 12 is run on the virtual controller, the robot graphic 216 moves to simulate the movement of the one or more robots.

Although many of the embodiments of the present invention are described herein in the context of the device 14 being an industrial robot manipulator, it should be appreciated that the present invention is not limited to use for programming an industrial robot manipulator. For example, the device 14 may be a mobile robot, or any other device or system having an operation comprising a plurality of actions, behaviors, or operating patterns, wherein each action etc. can be controlled by a software segment and wherein the software segments can be chained together to form a working software program for controlling the operation of the device or system.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of developing an executable software program for controlling an object, the method comprising:
   providing a library of segments of software code with metadata, wherein the metadata of each segment identifies the segment and includes a status of the segment that includes whether the segment has been executed;
   selecting a plurality of the segments from the library;
   connecting the selected segments;
   executing a first selected segment;

updating the metadata for the first selected segment to convey that the first selected segment has been executed; and displaying graphical representations of the selected segments, wherein the graphical representations convey the statuses of the selected segments, with the representation for the first selected segment conveying that the first selected segment has been executed.

2. The method of claim 1, further comprising eliciting information from a user and receiving information from the user; and wherein the selection of the segments is made using the received information.

3. The method of claim 1, further comprising providing a previously-developed software program infused with metadata, and wherein the connecting of the selected segments comprises adding the selected segments into the previously-developed software program.

4. The method of claim 3, further comprising:

displaying a graphical representation of the previously-developed software program on a first portion of a screen; and displaying graphical representations of the segments of the library on a second portion of the screen; and wherein the adding of the selected segments into the previously-developed software program comprises dragging the graphical representations of the selected segments from the second portion of the screen and dropping them into the graphical representation of the previously-developed software program in the first portion of the screen.

5. The method of claim 1, wherein the first selected segments includes default data and wherein the method further comprises receiving input data and changing the default data to the input data.

6. The method of claim 5, wherein the status of the first selected segments further includes whether the default data has been changed to the input data.

7. The method of claim 1, wherein changes in the statuses of the selected segments changes the graphical representations of the selected segments, respectively, and wherein the graphical representations of the selected segments are displayed in a program tree.

8. The method of claim 1, wherein the software program is for controlling a robot and wherein the segments of software code comprise robot code represented in a mark-up language.

9. A computer program product for use with a central processing unit (CPU), said product comprising:

a computer-readable medium;

a library of segments of software code with metadata, wherein the metadata of each segment identifies the segment and includes a status of the segment that includes whether the segment has been executed, said library being stored on the computer-readable medium;

a program stored on the computer-readable medium and having instructions for causing the CPU to execute a method of developing an executable software program for controlling an object, said method comprising:

selecting a plurality of the segments from the library;
connecting the selected segments;
executing a first selected segment;
updating the metadata for the first selected segment to convey that the first selected segment has been executed; and
displaying graphical representations of the selected segments, wherein the graphical representations convey the statuses of the selected segments, with the representation for the first selected segment conveying that the first selected segment has been executed.

10. The computer program product of claim 9, wherein the program stored on the computer-readable medium comprises a program development wizard and wherein the method further comprises:

eliciting information from a user; and
receiving information from the user; and
wherein the selection of the segments is made using the received information.

11. The computer program product of claim 9, wherein the first selected segments includes default data and wherein the method further comprises receiving input data and changing the default data to the input data.

12. The computer program product of claim 11, wherein the status of the first selected segments further includes whether the default data has been changed to the input data.

13. The computer program product of claim 9, wherein changes in the statuses of the selected segments changes the color of the graphical representations of the selected segments, respectively.

14. The computer program product of claim 9 wherein the segments of software code comprise robot code represented in XML.

15. An apparatus for controlling a robot, said apparatus comprising:

(a.) an interface device comprising a central processing unit (CPU) and a display;
(b.) a storage medium readable by the CPU;
(c.) a library of segments of robot code with metadata, wherein the metadata of each segment includes a status of the segment that includes whether the segment has been executed, said library being stored on the storage medium;
(d.) a program development wizard runnable on the CPU to execute a method of developing an executable robot control software program, said method comprising:
eliciting information from a user;
receiving information from the user;
using the received user information to select a plurality of the segments from the library;
combining the selected segments;
executing a first selected segment;
updating the metadata for the first selected segment to convey that the first selected segment has been executed; and
displaying graphical representations of the selected segments on the display; and
(e.) a robot controller for executing the robot control software program to control the robot.

16. The apparatus of claim 15, wherein the metadata of each segment of robot code identifies the segment.

17. The apparatus of claim 16, wherein upon execution by the controller, the robot control software program generated by the program development wizard controls the robot to move along a process path having a plurality of position points with default values, and wherein the apparatus further comprises a deployment wizard runnable on the CPU to execute a method of teaching the robot control software program comprising teaching the position points by replacing the default values with taught values.

18. The apparatus of claim 17, wherein the first selected segments is for moving the robot to one of the position points, and wherein the status in the metadata for the first selected segment further includes whether said one of the position points has a default value or a taught value.

19. The apparatus of claim 17, wherein the metadata further includes experiential data and wherein the apparatus further comprises an optimization wizard runnable on the CPU to execute a method of optimizing the robot control software program comprising using the experiential data to generate and display recommendations for changing the robot control software program.

20. The apparatus of claim 15, wherein the interface device is a teach pendant.

21. The apparatus of claim 15, wherein the segments of robot code are represented in XML.

22. A method of controlling a robot, comprising:
(a.) providing a display device and a robot program comprising metadata and robot code represented in XML;
(b.) interpreting the robot code to control the robot; and
(c.) interpreting the metadata to display graphical representations of the robot program on the display device; and
wherein steps (b.) and (c.) are performed simultaneously wherein the metadata identifies segments of the robot program and includes statuses of the segments, and wherein one of the segments has default data.

23. The method of claim 22, further comprising changing the default data to taught data, and wherein the status of said one of the segments is whether said one of the segments has default data or taught data.

24. A computer program product for use with a central processing unit (CPU) and a robot controller, said product comprising:
a computer-readable medium;
a robot control software program stored on the computer-readable medium, said robot control software program comprising robot code infused with metadata that identifies segments of the robot code and conveys the statuses of the segments, respectively, said robot control software program having instructions for causing the robot controller to move a robot along a process path having a plurality of position points with default values; and
a deployment wizard stored on the computer-readable medium and having instructions for causing the CPU to execute a method of teaching the robot control software program, said method including teaching the position points by replacing the default values with taught values and updating the metadata to convey that the position points have been taught; and
wherein the metadata includes information for teaching the position points.

25. The computer program product of claim 24, wherein the status of each of the segments includes whether the segments has been executed.

26. The computer program product of claim 24, further comprising an optimization wizard stored on the computer-readable medium and having instructions for causing the CPU to execute a method of optimizing the robot control software program comprising generating and displaying recommendations for changing the robot control software program.

27. The computer program product of claim 26, wherein the metadata further includes experiential data and wherein the optimization wizard uses the experiential data to generate the recommendations.

28. The computer program product of claim 24, wherein the robot code is represented in XML.

* * * * *

UNITED STATES PATENT AND TRADEMARK OFFICE
CERTIFICATE OF CORRECTION

PATENT NO. : 7,643,907 B2  Page 1 of 1
APPLICATION NO. : 11/054816
DATED : January 5, 2010
INVENTOR(S) : Fuhlbrigge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this

Sixteenth Day of November, 2010

David J. Kappos
*Director of the United States Patent and Trademark Office*